United States Patent
Kim et al.

(10) Patent No.: US 11,120,923 B2
(45) Date of Patent: Sep. 14, 2021

(54) WIRING MEMBER

(71) Applicant: Sumitomo Wiring Systems, Ltd., Mie (JP)

(72) Inventors: Kyungwoo Kim, Mie (JP); Toshinari Kobayashi, Mie (JP); Hironobu Yamamoto, Mie (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 16/593,089

(22) Filed: Oct. 4, 2019

(65) Prior Publication Data
US 2020/0111586 A1 Apr. 9, 2020

(30) Foreign Application Priority Data
Oct. 9, 2018 (JP) .............................. JP2018-190694

(51) Int. Cl.
| | |
|---|---|
| *H01B 7/00* | (2006.01) |
| *B60R 16/02* | (2006.01) |
| *H01B 3/30* | (2006.01) |
| *H01B 7/282* | (2006.01) |

(52) U.S. Cl.
CPC ....... *H01B 7/0045* (2013.01); *B60R 16/0215* (2013.01); *H01B 3/308* (2013.01); *H01B 7/2825* (2013.01)

(58) Field of Classification Search
None
See application file for complete search history.

(56) References Cited

U.S. PATENT DOCUMENTS

| | | | | |
|---|---|---|---|---|
| 1,718,537 A | * | 6/1929 | De Reamer | H01B 7/0045 307/149 |
| 2,933,550 A | * | 4/1960 | Cole | H04B 15/025 174/76 |
| 3,471,629 A | * | 10/1969 | O'Leary | H02G 3/185 174/666 |
| 3,984,622 A | * | 10/1976 | Ross | H01B 7/0045 174/72 A |

(Continued)

FOREIGN PATENT DOCUMENTS

JP   2015133822 A   *   7/2015

OTHER PUBLICATIONS

English Translation of JP-2015133822-A . "2014003836.A_Description" (Year: 2015).*

*Primary Examiner* — Timothy J. Dole
*Assistant Examiner* — Muhammed Azam
(74) *Attorney, Agent, or Firm* — Honigman LLP

(57) ABSTRACT

A wiring member is provided with a plurality of electrical wires, a first resin molded part, and a second resin molded part. In the plurality of electrical wires, a first bundled wire part branches into a first branched wire part and a second bundled wire part at a first branch position, and the second bundled wire part branches into a second branched wire part and a third branched wire part at a second branch position. The first resin molded part covers the electrical wires at the first branch position, and maintains an extension direction of the first branched wire part. The second resin molded part is formed separately to the first resin molded part, covers the electrical wires at the second branch position, and maintains extension directions of the second branched wire part and the third branched wire part.

6 Claims, 5 Drawing Sheets

(56) References Cited

U.S. PATENT DOCUMENTS

| | | | | |
|---|---|---|---|---|
| 4,176,245 A * | 11/1979 | Merlack | H02G 15/18 | 174/92 |
| 4,280,062 A * | 7/1981 | Miller | B60Q 1/305 | 174/72 A |
| 4,467,002 A * | 8/1984 | Crofts | B29C 61/0616 | 428/34.9 |
| 4,822,956 A * | 4/1989 | Sepe | H01B 7/0045 | 174/103 |
| 5,168,124 A * | 12/1992 | Takase | H01R 4/70 | 174/23 R |
| 5,227,585 A * | 7/1993 | Zen | G02B 6/4459 | 138/115 |
| 5,315,062 A * | 5/1994 | Hoshino | H01R 13/506 | 174/72 C |
| 5,399,812 A * | 3/1995 | Woszczyna | B60R 16/0215 | 138/115 |
| 5,448,017 A * | 9/1995 | Nakajima | B60R 16/0215 | 174/152 G |
| 5,536,904 A * | 7/1996 | Kojima | H01B 7/285 | 156/48 |
| 5,623,169 A * | 4/1997 | Sugimoto | B60R 16/0207 | 307/10.1 |
| 5,676,563 A * | 10/1997 | Kondo | E04D 13/103 | 439/435 |
| 5,895,889 A * | 4/1999 | Uchida | B60R 16/0207 | 174/72 A |
| 5,909,099 A * | 6/1999 | Watanabe | H02J 7/0042 | 320/108 |
| 5,980,329 A * | 11/1999 | Klein | H01R 43/24 | 439/736 |
| 6,015,952 A * | 1/2000 | Mori | B60R 16/0222 | 16/2.1 |
| 6,114,632 A * | 9/2000 | Planas, Sr. | H01B 9/003 | 174/117 R |
| 6,217,376 B1 * | 4/2001 | Morita | H01R 13/5213 | 439/519 |
| 6,246,001 B1 * | 6/2001 | Fukui | H01R 9/034 | 174/78 |
| 6,291,770 B1 * | 9/2001 | Casperson | B60R 16/0207 | 174/139 |
| 6,296,240 B1 * | 10/2001 | Nakai | H01B 13/01209 | 269/254 CS |
| 7,687,714 B2 * | 3/2010 | Deterre | H01R 13/6584 | 174/72 R |
| 7,999,408 B2 * | 8/2011 | Fehr | B60R 16/0315 | 307/10.1 |
| 9,396,845 B2 * | 7/2016 | Nagahashi | H01B 9/04 | |
| 9,561,758 B2 * | 2/2017 | Wakabayashi | B60R 16/0215 | |
| 9,595,369 B2 * | 3/2017 | Hamabayashi | H01B 7/0045 | |
| 9,809,180 B2 * | 11/2017 | Kuroishi | B60R 16/0215 | |
| 10,518,722 B2 * | 12/2019 | Imoto | B60R 16/03 | |
| 2001/0019919 A1 * | 9/2001 | Mochizuki | H01R 12/778 | 439/494 |
| 2002/0023770 A1 * | 2/2002 | Motokawa | B60R 16/0207 | 174/72 A |
| 2003/0023947 A1 * | 1/2003 | Sakakura | B60R 16/0207 | 716/126 |
| 2004/0016562 A1 * | 1/2004 | Aoki | B60R 16/0215 | 174/68.1 |
| 2004/0045734 A1 * | 3/2004 | Tsunoda | B60R 16/0215 | 174/72 A |
| 2005/0241715 A1 * | 11/2005 | Suzuki | B60R 16/0215 | 138/110 |
| 2006/0131048 A1 * | 6/2006 | Kogure | B60R 16/0215 | 174/72 A |
| 2006/0131049 A1 * | 6/2006 | Kogure | B60R 16/0215 | 174/72 A |
| 2006/0134970 A1 * | 6/2006 | Watanabe | B60R 16/0215 | 439/501 |
| 2008/0277015 A1 * | 11/2008 | Tanaka | F16L 21/06 | 138/110 |
| 2009/0084578 A1 * | 4/2009 | Irisawa | B60R 16/0215 | 174/135 |
| 2010/0218976 A1 * | 9/2010 | Suzuki | B60R 16/0215 | 174/135 |
| 2010/0230157 A1 * | 9/2010 | Sakata | B60R 16/0215 | 174/72 A |
| 2010/0243824 A1 * | 9/2010 | Desai | F16L 3/127 | 248/65 |
| 2011/0120747 A1 * | 5/2011 | Muneyasu | B60R 16/0207 | 174/113 R |
| 2011/0308857 A1 * | 12/2011 | Zapata | H01R 4/183 | 174/88 R |
| 2012/0261184 A1 * | 10/2012 | Kitamura | B60R 16/0215 | 174/72 A |
| 2013/0098660 A1 * | 4/2013 | Igarashi | H02G 3/0481 | 174/135 |
| 2013/0126232 A1 * | 5/2013 | Sakuma | H02G 15/046 | 174/72 A |
| 2013/0206928 A1 * | 8/2013 | Murakoshi | B60R 16/0215 | 248/73 |
| 2013/0306370 A1 * | 11/2013 | Sato | H01B 13/24 | 174/72 A |
| 2014/0144698 A1 * | 5/2014 | Sato | H02G 3/0481 | 174/72 A |
| 2015/0096802 A1 * | 4/2015 | Itani | B60R 16/0215 | 174/72 A |
| 2015/0310968 A1 * | 10/2015 | Murata | H01B 13/01254 | 264/272.15 |
| 2015/0329069 A1 * | 11/2015 | Daugherty | B60R 16/0207 | 174/72 A |
| 2015/0340848 A1 * | 11/2015 | Nakashima | C08G 18/4825 | 174/72 A |
| 2015/0355213 A1 * | 12/2015 | Kobayashi | G01P 1/026 | 324/207.25 |
| 2015/0372415 A1 * | 12/2015 | Ishihara | H01R 43/18 | 174/72 A |
| 2016/0001717 A1 * | 1/2016 | Kawashima | B60R 16/0215 | 248/68.1 |
| 2016/0013625 A1 * | 1/2016 | Suzuki | B60R 16/0215 | 174/72 A |
| 2016/0156168 A1 * | 6/2016 | Takeda | H02G 3/32 | 174/70 R |
| 2017/0313265 A1 * | 11/2017 | Shimizu | H01B 7/0045 | |
| 2017/0331263 A1 * | 11/2017 | Matsumura | H01B 7/0045 | |
| 2018/0005723 A1 * | 1/2018 | Kohori | H01B 3/441 | |
| 2018/0013273 A1 * | 1/2018 | Omura | H02G 3/0406 | |
| 2018/0082765 A1 * | 3/2018 | Endo | B60R 16/02 | |
| 2018/0083433 A1 * | 3/2018 | Kitagawa | H05K 9/0098 | |
| 2018/0118135 A1 * | 5/2018 | Tsukamoto | B60R 16/0207 | |
| 2018/0138676 A1 * | 5/2018 | Yabashi | H02G 3/0406 | |
| 2018/0174704 A1 * | 6/2018 | Sugino | H01B 7/0045 | |
| 2018/0182509 A1 * | 6/2018 | Sugino | H01B 7/0045 | |
| 2018/0316166 A1 * | 11/2018 | Shitamichi | H02G 3/0418 | |
| 2018/0331528 A1 * | 11/2018 | Takahashi | H01B 7/285 | |
| 2018/0334113 A1 * | 11/2018 | Saito | B60R 16/02 | |
| 2018/0336979 A1 * | 11/2018 | Nakashima | H01B 7/24 | |
| 2018/0361959 A1 * | 12/2018 | Toyosaka | B60R 16/0215 | |
| 2019/0006834 A1 * | 1/2019 | Komori | H02G 15/013 | |
| 2019/0029149 A1 * | 1/2019 | Shimizu | B60R 16/0215 | |
| 2019/0071036 A1 | 3/2019 | Shimizu et al. | | |
| 2019/0077341 A1 * | 3/2019 | Kohori | H01B 11/02 | |
| 2019/0118739 A1 * | 4/2019 | Takamatsu | H01R 13/44 | |
| 2019/0126860 A1 * | 5/2019 | Takamatsu | B60R 16/0215 | |
| 2019/0190198 A1 * | 6/2019 | Zhang | F16C 1/26 | |
| 2019/0267157 A1 * | 8/2019 | Nakamura | B60R 16/0207 | |
| 2019/0295741 A1 * | 9/2019 | Kobayashi | H01B 9/006 | |
| 2019/0295744 A1 * | 9/2019 | Kobayashi | B60T 8/17 | |
| 2019/0375347 A1 * | 12/2019 | Kotani | H02G 3/0481 | |
| 2020/0059077 A1 * | 2/2020 | Kim | H02G 3/0481 | |
| 2020/0111587 A1 * | 4/2020 | Kim | H02G 3/32 | |
| 2020/0111588 A1 * | 4/2020 | Yamamoto | B60R 16/0207 | |
| 2020/0223381 A1 * | 7/2020 | Kobayashi | H01B 13/01209 | |
| 2021/0012924 A1 * | 1/2021 | Hiromori | H01B 7/00 | |
| 2021/0012925 A1 * | 1/2021 | Omae | H05K 9/0043 | |

* cited by examiner

WIRING MEMBER

CROSS-REFERENCE TO RELATED APPLICATIONS

This application claims priority of Japanese Patent Application No. JP 2018-190694 filed on Oct. 9, 2018, the contents of which are incorporated herein.

TECHNICAL FIELD

This disclosure relates to a wiring member.

BACKGROUND

JP 2016-91731A discloses a technology in which an ABS sensor cable and a parking brake cable provided in a compound harness branch from an end part of a sheath in the compound harness, and a molded part is provided in the branch portion.

In JP 2016-91731A, there are two branching cables, namely, the ABS sensor cable and the parking brake cable, but the case is also possible where there are three or more branching cables. In this case, when three or more cables branch from one branch position and are covered by one resin molded part, there is a chance that difficulties will be encountered in setting the extension directions of the three or more cables to three-dimensionally different extension directions or in parallel.

It is thus an object of the present disclosure to provide a technology that is able to increase the degree of freedom of extension directions of three or more branch wires.

SUMMARY

To solve the above-described problem, a first aspect of the disclosure is a wiring member in which a first bundled wire part that bundles a plurality of electrical wires branches into a first branched wire part and a second bundled wire part at a first branch position, and the second bundled wire part branches into a second branched wire part and a third branched wire part at a second branch position, the wiring member including a first resin molded part that covers the electrical wires at the first branch position, and maintains an extension direction, at the first branch position, of the first branched wire part, and a second resin molded part that is formed separately to the first resin molded part, covers the electrical wires at the second branch position, and maintains the extension direction, at the second branch position, of the second branched wire part and the third branched wire part.

A second aspect of the disclosure is the wiring member according to the first aspect, further including an exterior part that covers the second bundled wire part, between the first resin molded part and the second resin molded part.

A third aspect of the disclosure is the wiring member according to the second aspect, in which an end part of the exterior part on the first branch position side is covered with the first resin molded part, and an end part of the exterior part on the second branch position side is covered with the second resin molded part.

A fourth aspect of the disclosure is the wiring member according to the second or third aspect, in which the exterior part is integrally molded with one of the first resin molded part and the second resin molded part.

A fifth aspect of the disclosure is the wiring member according to any one of the first to fourth aspects, further including a sheath that covers the plurality of electrical wires, and in which the first resin molded part covers an end part of the sheath.

A sixth aspect of the disclosure is the wiring member according to any one of the first to fifth aspects, in which the extension direction of the first branched wire part maintained by the first resin molded part and the extension directions of the second branched wire part and the third branched wire part maintained by the second resin molded part are maintained in three-dimensionally different extension directions.

A seventh aspect of the disclosure is the wiring member according to any one of the first to sixth aspects, in which the extension direction of the first branched wire part maintained by the first resin molded part and the extension direction of the second branched wire part or the third branched wire part maintained by the second resin molded part are parallel.

An eighth aspect of the disclosure is the wiring member according to any one of the first to seventh aspects, in which a connection part to which an attachment member for attaching the wiring member to an attachment target is to be connected is formed in at least one of the first resin molded part and the second resin molded part.

According to the aspects, the first and second resin molded parts are respectively provided separately in the first and second branch positions, and thus the degree of freedom of the extension directions of the first branched wire part, the second branched wire part and the third branched wire part increases.

According to the second aspect, the second bundled wire part is covered by the exterior part, and thus exposure of the second bundled wire part is suppressed.

According to the third aspect, infiltration of water or the like into the first resin molded part and the second resin molded part through the exterior part can be suppressed.

According to the fourth aspect, the exterior part is integrally molded with the resin molded part, thus enabling an increase in the number of components to be suppressed.

According to the fifth aspect, the end part of the sheath can be waterproofed by the first resin molded part.

According to the sixth aspect, the first branched wire part, the second branched wire part and the third branched wire part can be extended in three-dimensionally different directions.

According to the seventh aspect, the first branched wire part and the second or third branched wire part can be extended in parallel.

According to the eighth aspect, the connection part can be provided integrally with the resin molded part.

DETAILED DESCRIPTION OF PREFERRED EMBODIMENTS

First Embodiment

Figure 1:
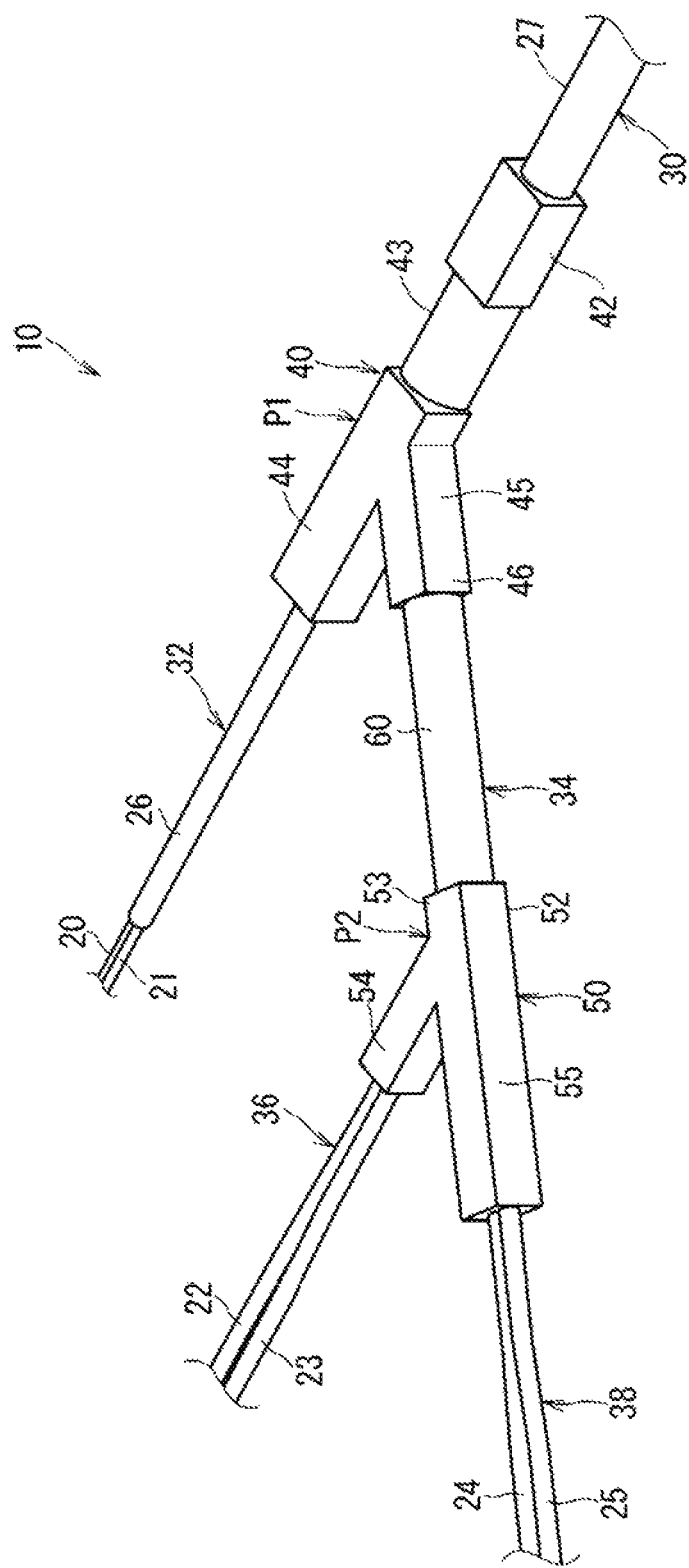
FIG. 1 is a perspective view showing a wiring member according to a first embodiment.
Figure 2:
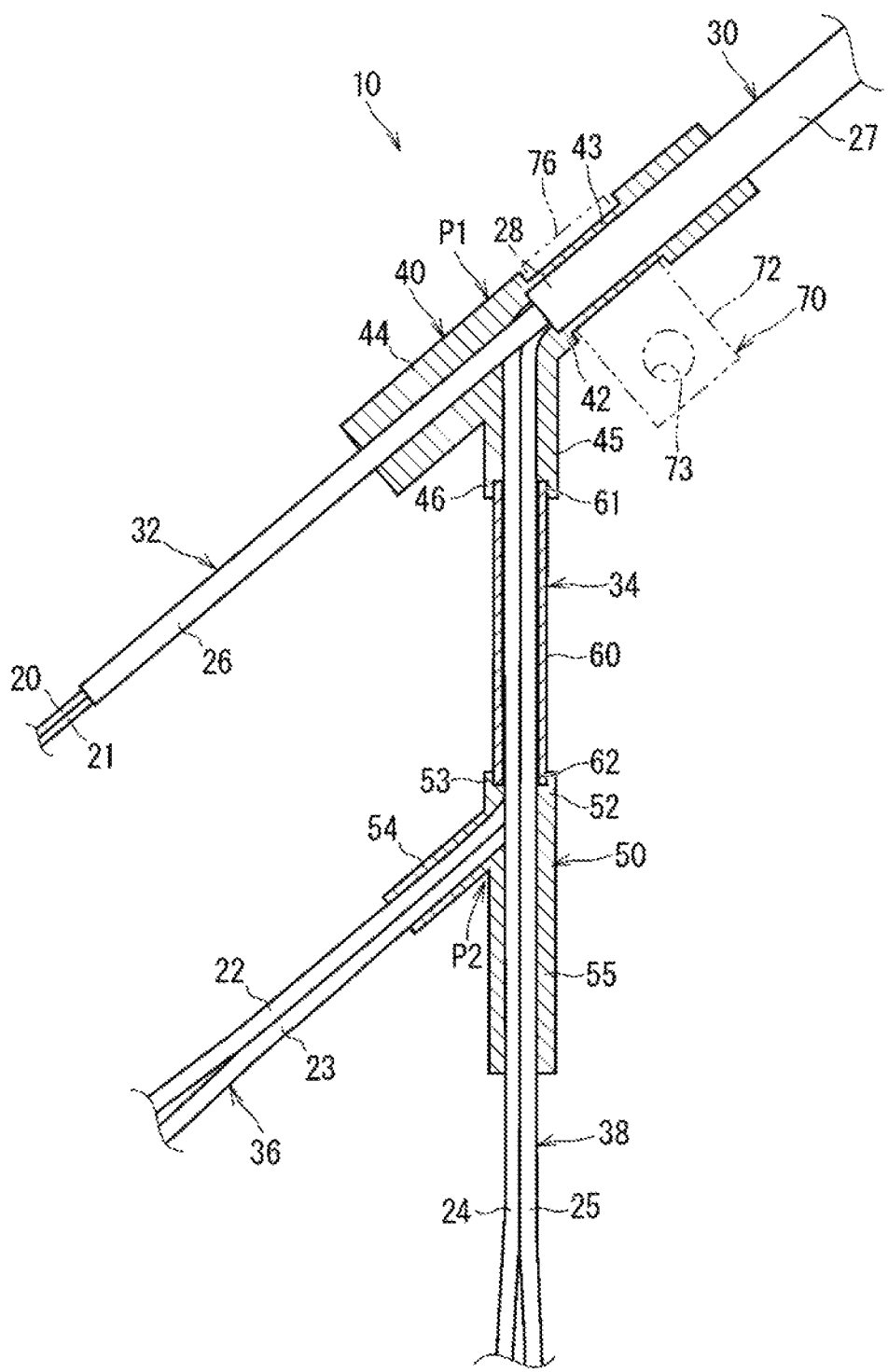
FIG. 2 is a longitudinal sectional view showing the wiring member according to the first embodiment.

Hereinafter, a wiring member according to a first embodiment will be described. FIG. 1 is a perspective view showing a wiring member 10 according to the first embodiment. FIG. 2 is a longitudinal sectional view showing the wiring member 10 according to the first embodiment. Note that electrical wires and a sheath covering the electrical wires are not shown in sectional view in FIG. 2. This similarly applies to the other longitudinal sectional views described below.

The wiring member 10 is provided with a plurality of electrical wires 20, 21, 22, 23, 24 and 25, a first resin molded part 40, and a second resin molded part 50. Furthermore, here, the wiring member 10 is provided with an exterior part 60.

The electrical wires 20 and 21 are provided with a core wire and a coating that surrounds the core wire. The core wire is a conductive wire formed by copper, a copper alloy, aluminum, an aluminum alloy or the like. The core wire may be a solid wire or may be a stranded wire. The coating is an insulating coating formed by a resin or the like, and is formed by performing a technique such as extrusion coating of a resin around the core wire. The electrical wires 20 and 21 are, for example, signal lines for performing signal transmission. In the case where the wiring member 10 is mounted in a vehicle, for example, the electrical wires 20 and 21 can serve as signal lines for transmitting signals from sensors (illustration omitted) for detecting the speed of the wheels in an anti-lock brake system (ABS). Note that the tip parts of the electrical wires 20 and 21 are omitted in FIGS. 1 and 2.

The electrical wires 22, 23, 24 and 25 are provided with a core wire and a coating that surrounds the core wire, similarly to the electrical wires 20 and 21. For example, the electrical wires 22, 23, 24 and 25 are power supply lines for transmitting power. For example, in the case where the wiring member 10 is mounted in a vehicle, the electrical wires 22, 23, 24 and 25 can serve as power supply lines for supplying power to an electric parking brake (EPB) or the like. Note that the tip parts of the electrical wires 22, 23, 24 and 25 are omitted in FIGS. 1 and 2.

The plurality of electrical wires 20, 21, 22, 23, 24 and 25 are surrounded by a sheath 27 (also called a jacket, etc.). The sheath 27 is an insulating coating formed by a resin or the like, and is formed by performing a technique such as extrusion coating of a resin around the plurality of electrical wires 20, 21, 22, 23, 24 and 25. The sheath 27 may be omitted.

The sheath 27 covers a portion of the plurality of electrical wires 20, 21, 22, 23, 24 and 25 near one end (upper portion in FIG. 2). The sheath 27 has an end part 28 from which the plurality of electrical wires 20, 21, 22, 23, 24 and 25 are exposed, at an intermediate position of the plurality of electrical wires 20, 21, 22, 23, 24 and 25 in the extending direction. The plurality of electrical wires 20, 21, 22, 23, 24 and 25 are bundled into one by the sheath 27 in the portion where the sheath 27 is provided.

The plurality of electrical wires 20, 21, 22, 23, 24 and 25 extend from the end part 28 of the sheath 27 and branch in multiple directions. Here, the plurality of electrical wires 20, 21, 22, 23, 24 and 25 branch in two, namely, into the electrical wires 20 and 21 and the electrical wires 22, 23, 24 and 25, at a first branch position P1. Also, the electrical wires 22, 23, 24 and 25 branch in two, namely, into the electrical wires 22 and 23 and the electrical wires 24 and 25, at a second branch position P2.

In the following description, the portion bundled by the sheath 27 in the portion near one end of the electrical wires 20, 21, 22, 23, 24 and 25 may be referred to as a first bundled wire part 30. Also, the respective portions of the electrical wires 20 and 21 and the electrical wires 22, 23, 24 and 25, among the electrical wires 20, 21, 22, 23, 24 and 25, that extend from the end part 28 of the sheath 27 and branch in two at the first branch position P1 may be referred to as a first branched wire part 32 and a second bundled wire part 34. Also, the respective portions of the electrical wires 22 and 23 and the electrical wires 24 and 25, among the electrical wires 22, 23, 24 and 25, that branch in two at the second branch position P2 may be referred to as a second branched wire part 36 and a third branched wire part 38.

Here, the first bundled wire part 30, the first branched wire part 32, the second first bundled wire part 34, the second branched wire part 36 and the third branched wire part 38 extend in one plane. More specifically, the first branched wire part 32 extends as a continuation of the first bundled wire part 30, and the second bundled wire part 34 extends in a direction intersecting therewith. Also, the third branched wire part 38 extends as a continuation of the second bundled wire part 34, and the second branched wire part 36 extends in a direction intersecting therewith. Naturally, the extending directions of the first bundled wire part 30, the first branched wire part 32, the second bundled wire part 34, the second branched wire part 36 and the third branched wire part 38 are not limited to those described above, and can be set to any direction. Also, the first bundled wire part 30, the first branched wire part 32, the second branched wire part 36 and the third branched wire part 38 do not bend other than at the branch positions, but may have a bent portion other than at the branch positions, and, furthermore, this bent portion may be covered with the resin molded part 40 or 50.

A coating layer 26 (also called a sheath, etc.) is formed around the electrical wires 20 and 21. Accordingly, a cable having the plurality of coated electrical wires 20 and 21 and the coating layer 26 that surrounds the plurality of coated electrical wires 20 and 21 is used as the electrical wires constituting the first branched wire part 32. This cable extends inside the sheath 27. In contrast, the electrical wires 22, 23, 24 and 25 are used singly as the electrical wires constituting the second bundled wire part 34. Accordingly, the sheath 27 covers the four single electrical wires 22, 23, 24 and 25 and one cable. Of course, one or a plurality of single coated electrical wires without the coating layer 26 may be used as the electrical wires constituting the first branched wire part 32, similarly to the electrical wires constituting the second bundled wire part 34. Also, a cable in which a plurality of coated electrical wires are covered with a coating layer may be employed as the electrical wires constituting the second bundled wire part 34. In the case where a cable is employed as the electrical wires constituting the second bundled wire part 34, the electrical wires 22, 23, 24 and 25 may be constituted to extend from the end part of the coating layer at the second branch position P2.

The first resin molded part 40 covers the end part 28 of the sheath 27 and a base end part of the plurality of electrical wires 20, 21, 22, 23, 24 and 25 that branch from the end part 28 of the sheath 27. In other words, the first resin molded part 40 is provided with a first bundled wire covering part 42 that covers the end part 28 of the sheath 27, a first branched wire covering part 44 that covers a portion of first branched wire part 32 near the end part 28 of sheath 27, and a second bundled wire covering part 45 that covers a portion of the second bundled wire part 34 near the end part 28 of the sheath 27.

A connection part 43 is formed in the first bundled wire covering part 42. The outer shape of the first bundled wire covering part 42, excluding the portion where the connection part 43 is formed, is formed to be square, although this is not essential, and the outer shape may be formed to be circular or the like. This similarly applies to other portions of the resin molded parts 40 and 50.

The connection part 43 is a portion to which an attachment member 70 is attached. The connection part 43 is narrower than other portions of the first bundled wire covering part 42, and external mounting of the attachment member 70 is facilitated. The connection part 43 is formed in a portion of the first bundled wire covering part 42 that covers the sheath 27. In particular, here, the connection part 43 is formed so as to be located toward an intermediate part of the sheath 27 from the edge of the end part 28. The thickness of the portion of the first bundled wire covering part 42 that covers the edge of the end part 28 of the sheath 27 can thereby be increased.

The first branched wire covering part 44 and the second bundled wire covering part 45 are continuously provided on the tip side of the first bundled wire covering part 42. The first branched wire covering part 44 and the second bundled wire covering part 45 extend in directions that intersect each other. The first branched wire covering part 44 extends as a continuation of the first bundled wire covering part 42. The second bundled wire covering part 45 extends in a direction that intersects the first bundled wire covering part 42 and the first branched wire covering part 44. Naturally, the second bundled wire covering part 45 may extend as a continuation of the first bundled wire covering part 42, and the first branched wire covering part 44 may extend in a direction that intersects the first bundled wire covering part 42 and the second bundled wire covering part 45. Also, the first bundled wire covering part 42, the first branched wire covering part 44 and the second bundled wire covering part 45 may extend in directions that intersect each other. The first branched wire covering part 44 maintains the extension direction of the first branched wire part 32. The second bundled wire covering part 45 maintains the extension direction of the second bundled wire part 34. The first branched wire covering part 44 and the second bundled wire covering part 45 cover fewer electrical wires compared with the first bundled wire covering part 42. Thus, the first branched wire covering part 44 and the second bundled wire covering part 45 may be formed more narrowly than the first bundled wire covering part 42. Of course, the first branched wire covering part 44 and the second bundled wire covering part 45 may be formed to be the same as or thicker than the first bundled wire covering part 42.

An exterior attachment part 46 is formed in the second bundled wire covering part 45. The exterior attachment part 46 will be described later.

The first resin molded part 40 is configured to retain the shape of the branch portion of the electrical wires 20, 21, 22, 23, 24 and 25 (routing maintenance), waterproof the end part 28 of the sheath 27, and the like. In particular, the portion of the first resin molded part 40 that is formed thickly compared with the connection part 43 mainly acts to retain the shape of the branch portion of the electrical wires 20, 21, 22, 23, 24 and 25 (routing maintenance), waterproof the end part 28 of the sheath 27, and the like. By waterproofing the end part 28 of the sheath 27 with the first resin molded part 40, infiltration of water or the like into the sheath 27 through the opening in the end part 28 of the sheath 27 can be prevented.

The second resin molded part 50 is molded separately from the first resin molded part 40. The second resin molded part 50 covers the end part of the second bundled wire part 34 and the base end part of the plurality of electrical wires 22, 23, 24 and 25 that branch from the end part of the second bundled wire part 34. In other words, the second resin molded part 50 is provided with a second bundled wire covering part 52 that covers the tip part of the second bundled wire part 34, a second branched wire covering part 54 that covers a portion of the second branched wire part 36 near the tip part of second bundled wire part 34, and a third branched wire covering part 55 that covers a portion of the third branched wire part 38 near the tip part of the second bundled wire part 34.

An exterior attachment part 53 is formed in the second bundled wire covering part 52. The exterior attachment part 53 will be described later.

The second branched wire covering part 54 and the third branched wire covering part 55 are continuously provided on the tip side of the second bundled wire covering part 52. The second branched wire covering part 54 and the third branched wire covering part 55 extend in directions that intersect each other. The third branched wire covering part 55 extends as a continuation of the second bundled wire covering part 52. The second branched wire covering part 54 extends in a direction that intersects the second bundled wire covering part 52 and the third branched wire covering part 55. Naturally, the second bundled wire covering part 52, the second branched wire covering part 54 and the third branched wire covering part 55 may extend in directions that intersect each other. The second branched wire covering part 54 maintains the extension direction of the second branched wire part 36. The third branched wire covering part 55 maintains the extension direction of the third branched wire part 38. The second branched wire covering part 54 and the third branched wire covering part 55 cover fewer electrical wires compared with the second bundled wire covering part 52. Thus, the second branched wire covering part 54 and the third branched wire covering part 55 may be formed more narrowly than the second bundled wire covering part 52. Of course, the second branched wire covering part 54 and the third branched wire covering part 55 may be formed to be the same as or thicker than the second bundled wire covering part 52.

The second resin molded part 50 is configured to retain the shape of the branch portion of the electrical wires 22, 23, 24 and 25 (routing maintenance).

Here, the first branched wire covering part 44 and the second branched wire covering part 54 maintain the extension direction of the first branched wire part 32 and the second branched wire part 36, such that the first branched wire part 32 and the second branched wire part 36 extend in parallel. Also, the first branched wire covering part 44 maintains the extension direction of the first branched wire part 32, such that the first branched wire part 32 extends as a continuation of the first bundled wire part 30. Of course, the first branched wire part 32 may extend in a direction that intersects the first bundled wire part 30. Also, the third branched wire covering part 55 maintains the extension direction of the third branched wire part 38, such that the third branched wire part 38 extends as a continuation of the second bundled wire part 34. Of course, the third branched wire part 38 may extend in a direction that intersects the second bundled wire part 34.

The exterior part 60 covers the second bundled wire part 34 between the first resin molded part 40 and the second resin molded part 50. The exterior part 60 is a separate component from the first resin molded part 40 and the second resin molded part 50. As this exterior part 60, a rubber hose, a urethane hose, a corrugated tube or the like can be used, for example. The exterior part 60 is considered to be continuously connected in the circumferential direction. A first end part 61 which is an end part of the exterior part 60 on the first resin molded part 40 side is attached to the exterior attachment part 46, and a second end part 62 which is an end part of the exterior part 60 on the second resin molded part 50 side is attached to the exterior attachment part 53.

Here, the first end part 61 of the exterior part 60 is covered with the first resin molded part 40. The first end part 61 of the exterior part 60 is buried in the exterior attachment part 46. The first end part 61 of the exterior part 60 is waterproofed by the first resin molded part 40. Also, the second end part 62 of the exterior part 60 is covered with the second resin molded part 50. The second end part 62 of the exterior part 60 is buried in the exterior attachment part 53. The second end part 62 of the exterior part 60 is waterproofed by the second resin molded part 50. An intermediate part of the exterior part 60 is not covered by the resin molded parts 40 and 50, and is exposed.

The exterior part 60 is formed in a cylindrical shape in cross-section. The outer shape of the exterior attachment parts 46 and 53 that cover this exterior part 60 is formed to be square, although this is not essential, and the outer shape may be formed to be circular or the like.

The exterior part 60 may maintain the routing of the second bundled wire part 34. In other words, the second bundled wire part 34 with the exterior part 60 may be bend resistant. Naturally, the second bundled wire part 34 with the exterior part 60 may also be readily bendable.

A first resin molded part 40 such as described above can, for example, be formed by a resin such as a urethane resin. Specifically, a first resin molded part 40 such as described above can, for example, be integrally formed by insert molding, using an injection mold, with the end part of the first bundled wire part 30 (here, end part 28 of sheath 27), the base end part of the first branched wire part 32 and the base end part of the second bundled wire part 34 (here, first end part 61 of exterior part 60) as insert target portions. In other words, the first resin molded part 40 is a molded component. This first resin molded part 40 seals the opening in the end part 28 of the sheath 27, in a state of liquid-tight contact with the outer perimeter surface of the sheath 27, the outer perimeter surface of the first branched wire part 32 (here, outer perimeter surface of coating layer 26), and the outer perimeter surface of the second bundled wire part 34 (here, outer perimeter surface of exterior part 60). Also, the first resin molded part 40 seals the opening in the first end part 61 of the exterior part 60, in a state of liquid-tight contact with the outer perimeter surface of the second bundled wire part 34 (here, outer perimeter surface of exterior part 60).

Also, a second resin molded part 50 such as described above can be formed by a resin such as a urethane resin, for example. Specifically, a second resin molded part 50 such as described above can, for example, be integrally formed by insert molding, using an injection mold, with the tip part of the second bundled wire part 34 (here, second end part 62 of exterior part 60), the base end part of the second branched wire part 36 and the base end part of the third branched wire part 38 as insert target portions. In other words, the second resin molded part 50 is a molded component. This second resin molded part 50 seals the opening in the second end part 62 of the exterior part 60, in the state of liquid-tight contact with the outer perimeter surface of the second bundled wire part 34 (here, outer perimeter surface of exterior part 60), the outer perimeter surface of the second branched wire part 36 (here, outer perimeter surface of coating of electrical wires 22 and 23), and the outer perimeter surface of the third branched wire part 38 (here, outer perimeter surface of coating of electrical wires 22 and 23).

Note that, with the first resin molded part 40 and the second resin molded part 50, the first resin molded part 40 may be formed first, the second resin molded part 50 may be formed first, or both resin molded parts may be formed at the same time.

The second bundled wire covering part 45 and exterior attachment part 46 formed in the first resin molded part 40 can be taken as a second bundled wire base end covering part and an exterior part first end attachment part. Similarly, the second bundled wire covering part 52 and exterior attachment part 53 formed in the second resin molded part 50 can be taken as a second bundled wire tip covering part and an exterior part second end attachment part.

The attachment member 70 for attaching the wiring member 10 to an attachment target is provided on the first resin molded part 40. The attachment target is a vehicle, for example. For example, in the case where this wiring member 10 is mounted in a vehicle, and the electrical wires 20, 21, 22, 23, 24 and 25 are for use with an EPB, sensors that detect the rotation speed of the wheels and the like, one end part (pre-branch portion; illustration omitted) of the wiring member 10 is connected to a site on the vehicle body side and the other end part (tip parts of first branched wire part 32, second branched wire part 36 and third branched wire part 38) is connected to a site on the wheel side. Also, the attachment member 70 is attached to the vehicle body and supports an intermediate part of the wiring member 10 in a fixed position.

The connection part 43 is formed in the first resin molded part 40, as described above. The connection part 43 is provided in the first bundled wire covering part 44. The connection part 43 is narrower than other portions of the first bundled wire covering part 42, and is provided with the attachment member 70 in an externally mountable manner.

The attachment member 70 includes a first attachment part 72 and a second attachment part 76. The first attachment part 72 is the portion that is attached to an attachment target such as a vehicle. The second attachment part 76 is the portion that is connected to the first resin molded part 40. A configuration is adopted in which the first attachment part 72 is formed to be plate-like, and has a through hole 73 formed therein for fastening a bolt to be attached to the attachment target by tightening or the like. The second attachment part 76 is formed to be plate-like and is connected to the first resin molded part 40 by being crimped to the connection part 43. The attachment member 70 is a member integrally molded using a resin, a metal or the like, and is also called a bracket or the like.

According to the wiring member 10 constituted as described above, the first and second resin molded parts 40 and 50 are respectively provided separately at the first and second branch positions P1 and P2, and thus the degree of freedom of the extension directions of the first branched wire part 32, the second branched wire part 36 and the third branched wire part 38 increases. Here, the extension direction of the first branched wire part 32 maintained by the first resin molded part 40 and the extension direction of the second branched wire part 36 maintained by the second resin molded part 50 are parallel. In other words, the first branched wire part 32 and the second branched wire part 36 can be extended in parallel.

Also, since the second bundled wire part 34 is covered by the exterior part 60, exposure of the second bundled wire part 34 is suppressed. The second bundled wire part 34 can thereby be protected from flying rocks and the like. At this time, the exterior part 60 is provided in a manner capable of routing maintenance of the second bundled wire part 34, and, in the case where routing maintenance of the entire second bundled wire part 34 is carried out together with the resin molded parts 40 and 50, the extension directions of the second branched wire part 36 and the third branched wire part 38 with respect to the extension direction of the first branched wire part 32 can be maintained with high accuracy.

Also, since the first end part 61 of the exterior part 60 is covered with the first resin molded part 40 and the second end part 62 is covered with the second resin molded part 50, infiltration of water or the like into the first resin molded part 40 and the second resin molded part 50 through the exterior part 60 can be suppressed.

Also, since the exterior part 60 is a separate component from the resin molded parts 40 and 50, the mold for the resin molded parts 40 and 50 can be reduced in size. Also, differentiating the characteristics of the exterior part 60 from the characteristics of the resin molded parts 40 and 50 is facilitated.

Also, since the connection part 43 is formed in the first resin molded part 40, the connection part 43 can be provided integrally with the first resin molded part 40.

Also, since the first resin molded part 40 covers the end part 28 of the sheath 27, the end part 28 of the sheath 27 can be waterproofed by the first resin molded part 40. In other words, a waterproofing part and the connection part 43 can be integrally molded. Due to the end part 28 of the sheath 27 being waterproofed by the first resin molded part 40, infiltration of water or the like into the sheath 27 through the opening in the end part 28 of the sheath 27 can be prevented.

Second Embodiment

Figure 3:
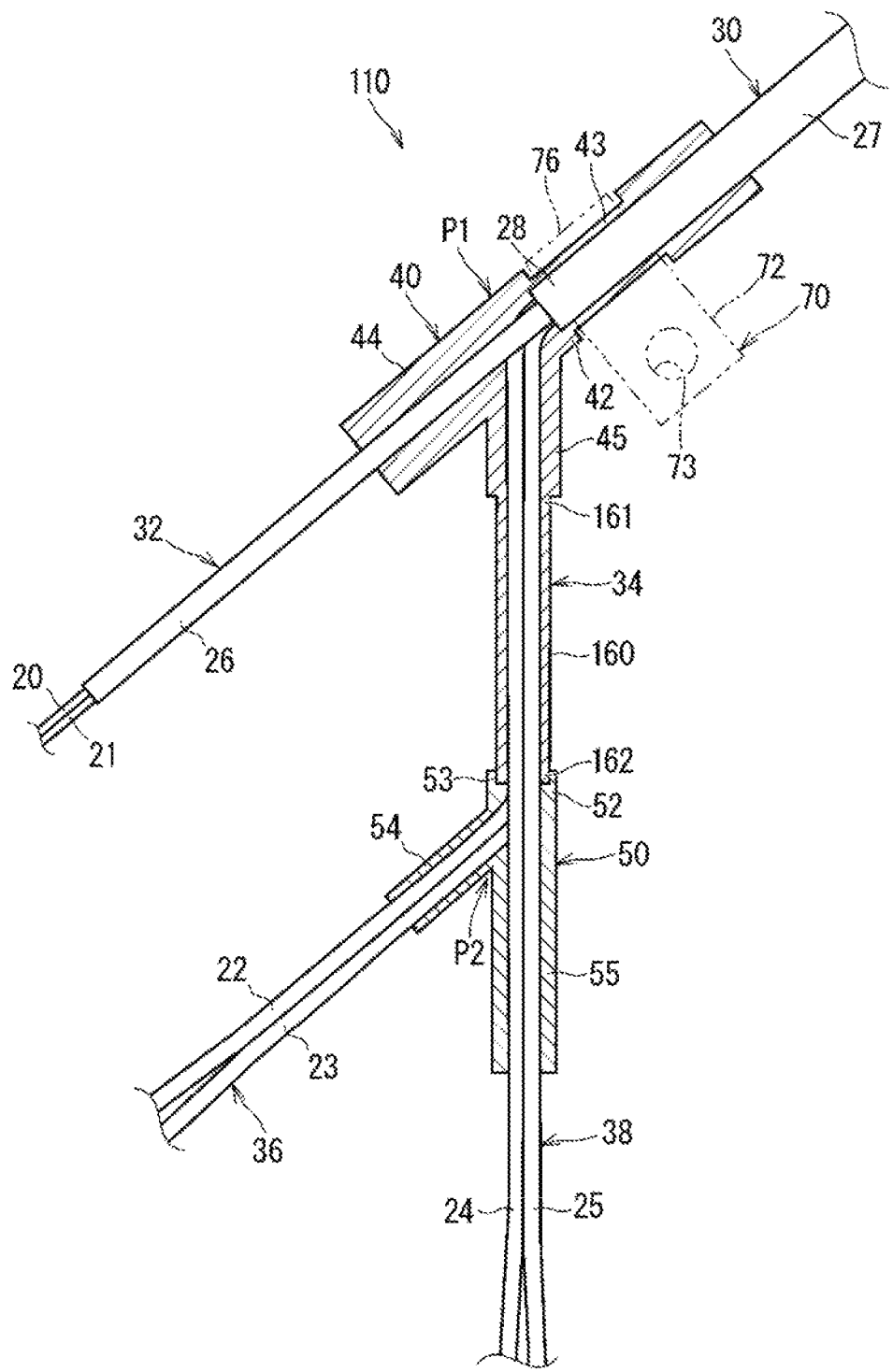
FIG. 3 is a longitudinal sectional view showing a wiring member according to a second embodiment.

A wiring member according to a second embodiment will be described. FIG. 3 is a longitudinal sectional view showing a wiring member 110 according to the second embodiment. Note that, in the description of the present embodiment, the same reference signs are given to constituent elements that are similar to those described previously, and description thereof will be omitted. This similarly applies to the description of the following embodiments and variations.

With the wiring member 110 according to the second embodiment, the configuration of an exterior part 160 differs from the configuration of the exterior part 60 in the wiring member 10 according to the first embodiment.

The exterior part 160 is integrally molded with the first resin molded part 40. A first end part 161 of the exterior part 160 extends from the second bundled wire covering part 45 of the first resin molded part 40. In contrast, a second end 162 of the exterior part 160 is covered by the second bundled wire covering part 52 of the second resin molded part 50.

Such a wiring member 110 can be manufactured as follows. That is, the first resin molded part 40 and the exterior part 160 integrally molded therewith are formed first at the first branch position P1, by insert molding using an injection mold with the electrical wires 20, 21, 22, 23, 24 and 25 with the sheath 27 as insert target portions. At this time, the exterior part 160 is in liquid-tight contact with the second bundled wire part 34 (here, coating of electrical wires 22, 23, 24, 25). Thereafter, the second resin molded part 50 is formed at the second branch position P2, by insert molding using an injection mold with the electrical wires 22, 23, 24 and 25 and the exterior part 160 as insert target portions. In this way, an increase in the number of components can be suppressed when the exterior part 160 is integrally molded with the first resin molded part 40.

Third Embodiment

Figure 4:
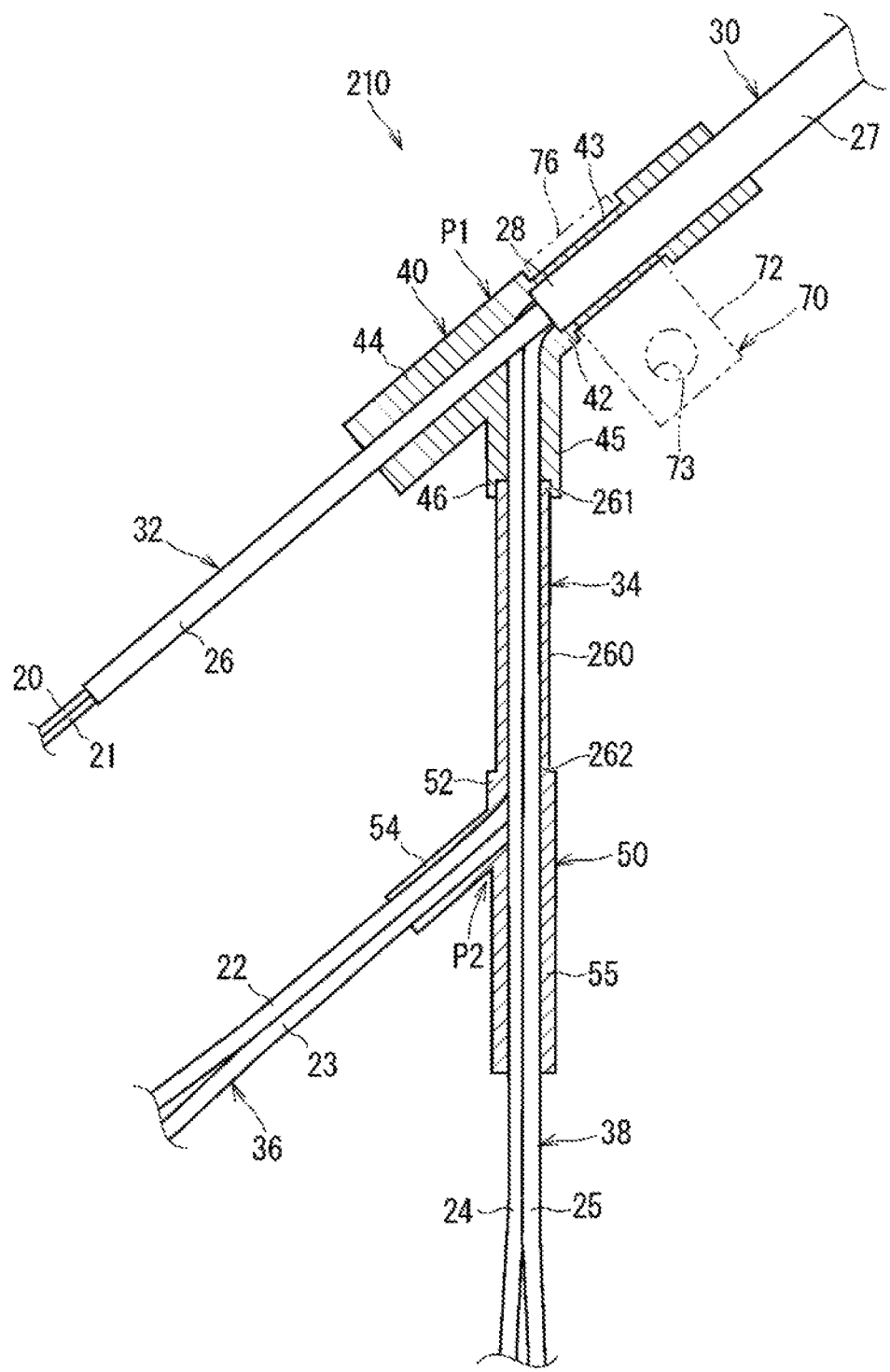
FIG. 4 is a longitudinal sectional view showing a wiring member according to a third embodiment.

A wiring member according to a third embodiment will be described. FIG. 4 is a longitudinal sectional view showing a wiring member 210 according to the third embodiment.

With the wiring member 210 according to the third embodiment, the configuration of an exterior part 260 differs from the configuration of the exterior part 60 in the wiring member 10 according to the first embodiment and the configuration of the exterior part 160 in the wiring member 110 according to the second embodiment.

The exterior part 260 is integrally molded with the second resin molded part 50. A second end part 262 of the exterior part 260 extends from the second bundled wire covering part 52 of the second resin molded part 50. In contrast, a first end part 261 of the exterior part 260 is covered by the second bundled wire covering part 45 of the first resin molded part 40.

Such a wiring member 210 can be manufactured as follows. That is, the second resin molded part 50 and the exterior part 260 integrally molded therewith are formed first at the second branch position P2, by insert molding using an injection mold with the electrical wires 22, 23, 24 and 25 as insert target portions. At this time, the exterior part 260 is in liquid-tight contact with the second bundled wire part 34 (here, coating of electrical wires 22, 23, 24, 25). Thereafter, the first resin molded part 40 is formed at the first branch position P1, by insert molding using an injection mold with the electrical wires 20, 21, 22, 23, 24 and 25 with the sheath 27 and the exterior part 260 as insert target portions.

In this way, an increase in the number of components can be suppressed when the exterior part 260 is integrally molded with the second resin molded part 50.

Fourth Embodiment

Figure 5:
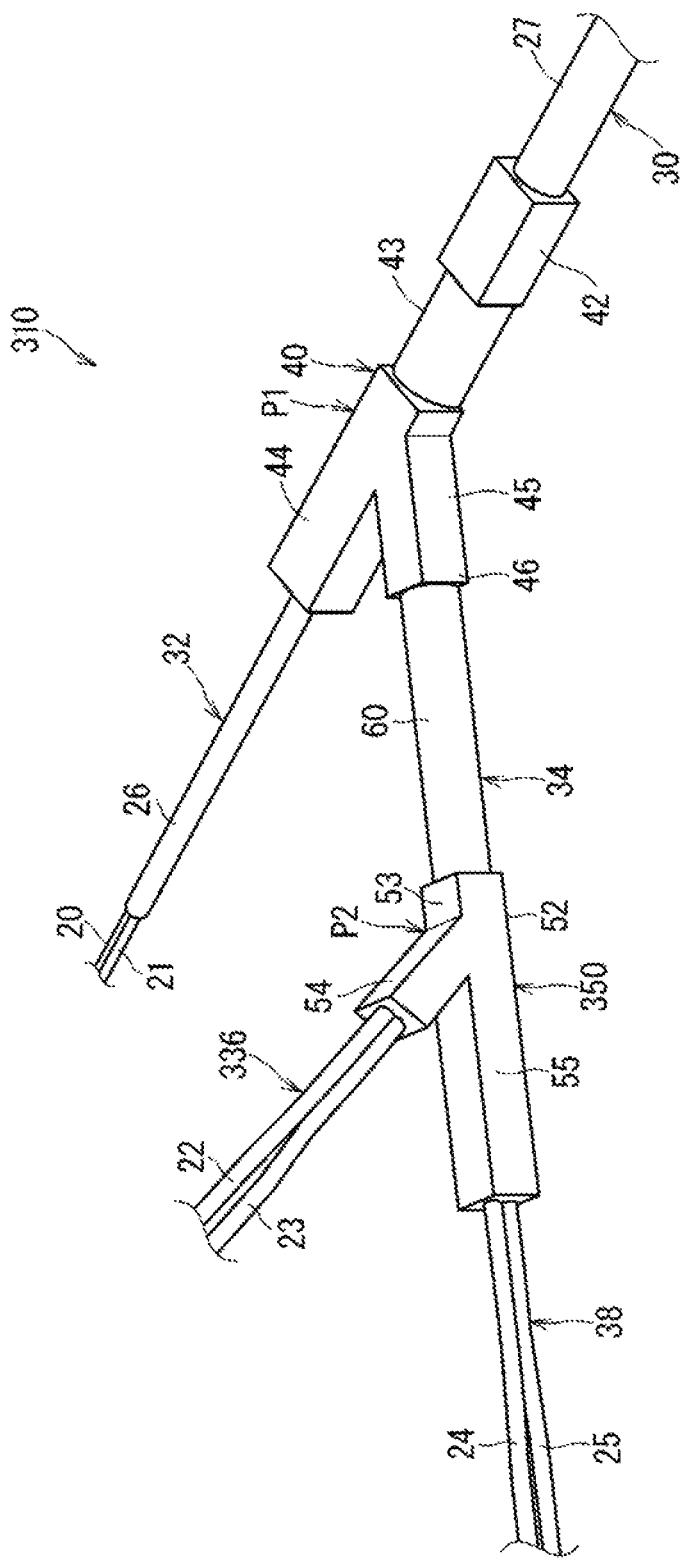
FIG. 5 is a perspective view showing a wiring member according to a fourth embodiment.

A wiring member according to a fourth embodiment will be described. FIG. 5 is a perspective view showing a wiring member 310 according to the fourth embodiment.

With the wiring member 310 according to the fourth embodiment, the orientation of a second resin molded part 350 with respect to the first resin molded part 40 differs from the orientation of the second resin molded part 50 with respect to the first resin molded part 40 in the wiring members 10, 110, and 210 according to the above embodiments. Specifically, the wiring member 310 according to the fourth embodiment is formed to have a shape in which the second resin molded part 50 of the wiring member 10 according to the first embodiment is rotated 90 degrees about an axis along the second bundled wire part 34.

In the wiring member 310, the extension direction of the first branched wire part 32 maintained by the first resin molded part 40 and the extension directions of the second branched wire part 336 and the third branched wire part 38 maintained by the second resin molded part 350 are maintained in three-dimensionally different extension directions.

Here, the extension direction of the first branched wire part 32 maintained by the first resin molded part 40 and the extension directions of the second branched wire part 336 and the third branched wire part 38 maintained by the second resin molded part 350 being maintained in three-dimensionally different extension directions refers to a straight line in the extension direction of the first branched wire part 32 intersecting a plane containing the extension directions of the second branched wire part 336 and the third branched wire part 38, rather than being in the plane. From another viewpoint, a straight line in the extension direction of the first branched wire part 32 and a straight line in the extension direction of the second branched wire part 336 or the third branched wire part 38 can also be taken as being in skewed positions.

At this time, the case is also possible where straight lines in the extension directions of both the second branched wire part and the third branched wire part are in skewed positions with respect to a straight line in the extension direction of the first branched wire part. The case is also possible where only a straight line in the extension direction of the second branched wire part, out of the second branched wire part and the third branched wire part, is in a skewed position with respect to a straight line in the extension direction of the first branched wire part. The case is also possible where only a straight line in the extension direction of the third branched wire part, out of the second branched wire part and the third branched wire part, is in a skewed position with respect to a straight line in the extension direction of the first branched wire part.

The example shown in FIG. 5 is an example of the case where only a straight line in the extension direction of the second branched wire part 336, out of the second branched wire part 336 and the third branched wire part 38, is in a skewed position with respect to a straight line in the extension direction of the first branched wire part 32. In other words, in the example shown in FIG. 5, the second branched wire part 336 is maintained so as to extend in a direction that intersects a plane containing the extension directions of the first branched wire part 32 and the third branched wire part 38.

According to such a wiring member 310, the first branched wire part 32, the second branched wire part 336 and the third branched wire part 38 can be readily extended in three-dimensionally different extension directions.

Variations

The above embodiments describe the wiring member as being provided with an exterior part, but this is not an essential configuration. The case is also possible where the wiring member is not provided with an exterior part. Also, even in the case where the wiring member is provided with an exterior part, the end part of the exterior part being waterproofed is not an essential configuration, and the end part of the exterior part need not be waterproofed. Also, the first end part of the exterior part being buried in the first resin molded part, in the case of not being integrally molded with the first resin molded part, is not an essential configuration, and the first end part of the exterior part may be externally mounted to the first resin molded part or may be separated from the first resin molded part. Similarly, the second end part of the exterior part being buried in the second resin molded part, in the case of not being integrally molded with the second resin molded part, is not an essential configuration, and the second end part of the exterior part may be externally mounted to the second resin molded part or may be separated from the second resin molded part.

Also, the embodiments describe the plurality of electrical wires as branching at two branch positions, but this is not an essential configuration. The plurality of electrical wires may branch at three or more branch positions. Also, the embodiments describe the plurality of electrical wires as branching in two at the first branch position P1, but this is not an essential configuration. The plurality of electrical wires may branch in three or more at the first branch position P1. This similarly applies to other branch positions.

Also, the first, second and third embodiments describe the extension direction of the second branched wire part 36 as being in parallel to the first branched wire part 32, but this is not an essential configuration. Also, the above fourth embodiment describes the extension directions of the first branched wire part 32, the second branched wire part 336 and the third branched wire part 38 as being maintained in three-dimensionally different extension directions, but this is not an essential configuration. The extension directions of the first branched wire part, the second branched wire part and the third branched wire part that are maintained by the first branched wire covering part, the second branched wire covering part and the third branched wire covering part can be set in any direction. For example, the extension direction of the third branched wire part 38 may be parallel to the first branched wire part 32. Also, for example, the first branched wire part, the second branched wire part and the third branched wire part need not extend in the same plane or be parallel to each other.

Also, the embodiments describe the first resin molded part 40 as waterproofing the end part 28 of the sheath 27, but this is not an essential configuration. The case is also possible where the first resin molded part 40 does not have a function of waterproofing the end part 28 of the sheath 27.

Also, the embodiments describe the wiring member 10 as being provided with the six electrical wires 20, 21, 22, 23, 24 and 25, but this is not an essential configuration. The wiring member 10 may be provided with three to five electrical wires, or may be provided with seven or more electrical wires. In the case where the wiring member 10 is provided with seven or more electrical wires, the seven or more electrical wires may be provided due to electrical wires for active suspension being employed, or the seven or more electrical wires may be provided due to electrical wires for sensors being employed, for example.

In the above embodiment and variations, the plurality of electrical wires may all be power lines, or the plurality of electrical wires may all be signal lines. Also, in the case where the plurality of electrical wires are a combination of power lines and signal lines, any number may be signal lines and any number may be power lines. For example, electrical wires for active suspension or electrical wires for sensors may be employed, instead of electrical wires for an EPB.

Also, the embodiments describe the attachment member 70 as being provided on the first resin molded part 40, but this is not an essential configuration. For example, the connection part may be formed in the second resin molded part instead of the first resin molded part 40, and the attachment member 70 may be provided on the second resin molded part. Also, for example, the attachment member 70 may be provided on both the first resin molded part 40 and the second resin molded part 50. Also, for example, the attachment member 70 need not be provided on both the first resin molded part 40 and the second resin molded part.

Also, even in the case where the attachment member 70 is provided on the first resin molded part or the second resin molded part, the attachment member 70 being externally mounted to the first resin molded part or the second resin molded part is not an essential configuration. For example, the attachment member may be attached in a state where the second attachment part thereof is buried in the connection part. In this case, the first resin molded part and the second resin molded part may be insert-molded using an injection mold with the second attachment part of the attachment member also as an insert target portion. Also, for example, the attachment member may be integrally molded with the resin molded part. In this case, the first attachment part 72 of the attachment member may be integrally molded with the connection part of the resin molded part so as to extend from the connection part, or may be integrally molded with another portion of the resin molded part. Furthermore, even in the case where the attachment member is externally mounted to the first resin molded part or the second resin molded part, the shape of the attachment member is not limited to that described above. The first attachment part need only be formed so as to be fixable to the attachment target, and may, for example, be formed in a clip shape that can be inserted into and engaged with a hole formed in the attachment target. Also, the second attachment part need only be formed so as to be attachable to the first resin molded part or the second resin molded part, and may, for example, be formed in a shape including a band part that can be wound around the first resin molded part or the second resin molded part and a band engaging part capable of engaging the tip of the band part.

Note that the respective configurations described in the embodiments and the variations can be combined as appropriate as long as there are no mutual inconsistencies.

Although this disclosure has been described in detail above, the descriptions above are in all respects illustrative, and the disclosure is not limited to those descriptions. It should be understood that innumerable variations that are not described herein can be envisaged without departing from the scope of the disclosure.

What is claimed is:

1. A wiring member in which a first bundled wire part that bundles six electrical wires with a sheath, branches into a first branched wire part and a second bundled wire part at a first branch position, and the second bundled wire part branches into a second branched wire part and a third branched wire part at a second branch position, the wiring member comprising:
   a first resin molded part that covers, at the first branch position, an end part of the sheath and the electrical wires extending from the end part of the sheath, and maintains an extension direction, at the first branch position, of the first branched wire part; and
   a second resin molded part that is formed separately to the first resin molded part, covers the electrical wires at the second branch position, and maintains the extension direction, at the second branch position, of the second branched wire part and the third branched wire part,
   wherein the six electrical wires of a first group, a second group and a third group constituting three groups of two electrical wires each that the six electrical wires are divided into are respectively the electrical wires of the first branched wire part, the electrical wires of the second branched wire part, and the electrical wires of the third branched wire part;
   the electrical wires of the first branched wire part and the electrical wires of the second bundled wire part branch at the first branch position so as to all extend from the first bundled wire part;
   the electrical wires of the first branched wire part are a different type of electrical wire from the electrical wires of the second branched wire part and the electrical wires of the third branched wire part,
   the wiring member further comprises an exterior part that covers the second bundled wire part, between the first resin molded part and the second resin molded part,
   the exterior part is cylindrically formed and is a separate component to the first resin molded part and the second resin molded part;
   an end part of the exterior part of a first branch position side is insert-molded to the first resin molded part and covered with the first resin molded part, and an end part of the exterior part on a second branch position side is insert-molded to the second resin molded part and covered with the second resin molded part; and
   the extension direction of the first branched wire part maintained by the first resin molded part and the extension directions of the second branched wire part and the third branched wire part maintained by the second resin molded part are maintained in three-dimensionally different extension directions.

2. The wiring member according to claim 1, wherein the exterior part is integrally molded with one of the first resin molded part and the second resin molded part.

3. The wiring member according to claim 1, wherein a connection part to which an attachment member for attaching the wiring member to an attachment target is to be connected is formed in at least one of the first resin molded part and the second resin molded part.

4. The wiring member according to claim 1, wherein the electrical wires of the second branched wire part and the electrical wires of the third branched wire part are respectively and directly covered by a second branched wire covering part and a third branched wire covering part, at an end part of the second resin molded part on the second branched wire part side and an end part of the second resin molded part on the third branched wire part side.

5. A vehicular wiring member in which a first bundled wire part that bundles six electrical wires with a sheath branches into a first branched wire part and a second bundled wire part at a first branch position, and the second bundled wire part branches into a second branched wire part and a third branched wire part at a second branch position, the wiring member comprising:
   a first resin molded part that covers, at the first branch position, an end part of the sheath and the electrical wires extending from the end part of the sheath, and maintains an extension direction, at the first branch position, of the first branched wire part; and
   a second resin molded part that is formed separately to the first resin molded part, covers the electrical wires at the second branch position, and maintains extension directions, at the second branch position, of the second branched wire part and the third branched wire part,
   wherein the electrical wires of a first group, a second group and a third group constituting three groups of two electrical wires each that the six electrical wires are divided into are respectively the electrical wires of the first branched wire part, the electrical wires of the second branched wire part, and the electrical wires of the third branched wire part,
   the electrical wires of the first branched wire part and the electrical wires of the second bundled wire part branch at the first branch position so as to all extend from the first bundled wire part,
   the electrical wires of the first branched wire part are a different type of electrical wire from the electrical wires of the second branched wire part and the electrical wires of the third branched wire part, an end part that is one end part of the six electrical wires on the first bundled wire part side is connected to a site on a vehicle body side, and an end part that is an other end part of the six electrical wires of the vehicular wiring member on the first branched wire part, second branched wire part and third branched wire part sides is connected to a site on a wheel side, the wiring member further comprises an exterior part that covers the second bundled wire part, between the first resin molded part and the second resin molded part, the exterior part is cylindrically formed and is a separate component to the first resin molded part and the second resin molded part, an end part of the exterior part on the first branch position side is insert-molded to the first resin molded part and covered with the first resin molded part, and an end part of the exterior part on the second branch position side is insert-molded to the second resin molded part and covered with the second resin molded part, and the extension direction of the first branched wire part maintained by the first resin molded part and the extension directions of the second branched wire part and the third branched wire part maintained by the second resin molded part are maintained in three-dimensionally different extension directions.

6. The vehicular wiring member according to claim 5, wherein the electrical wires of the second branched wire part and the electrical wires of the third branched wire part are respectively directly covered by a second branched wire covering part and a third branched wire covering part, at an end part of the second resin molded part on the second branched wire part side and an end part of the second resin molded part on the third branched wire part side.

* * * * *